INVENTOR.
KARL ZÄNGL

INVENTOR.
KARL ZÄNGL
BY
Woodhams, Blanchard & Flynn
ATTORNEYS

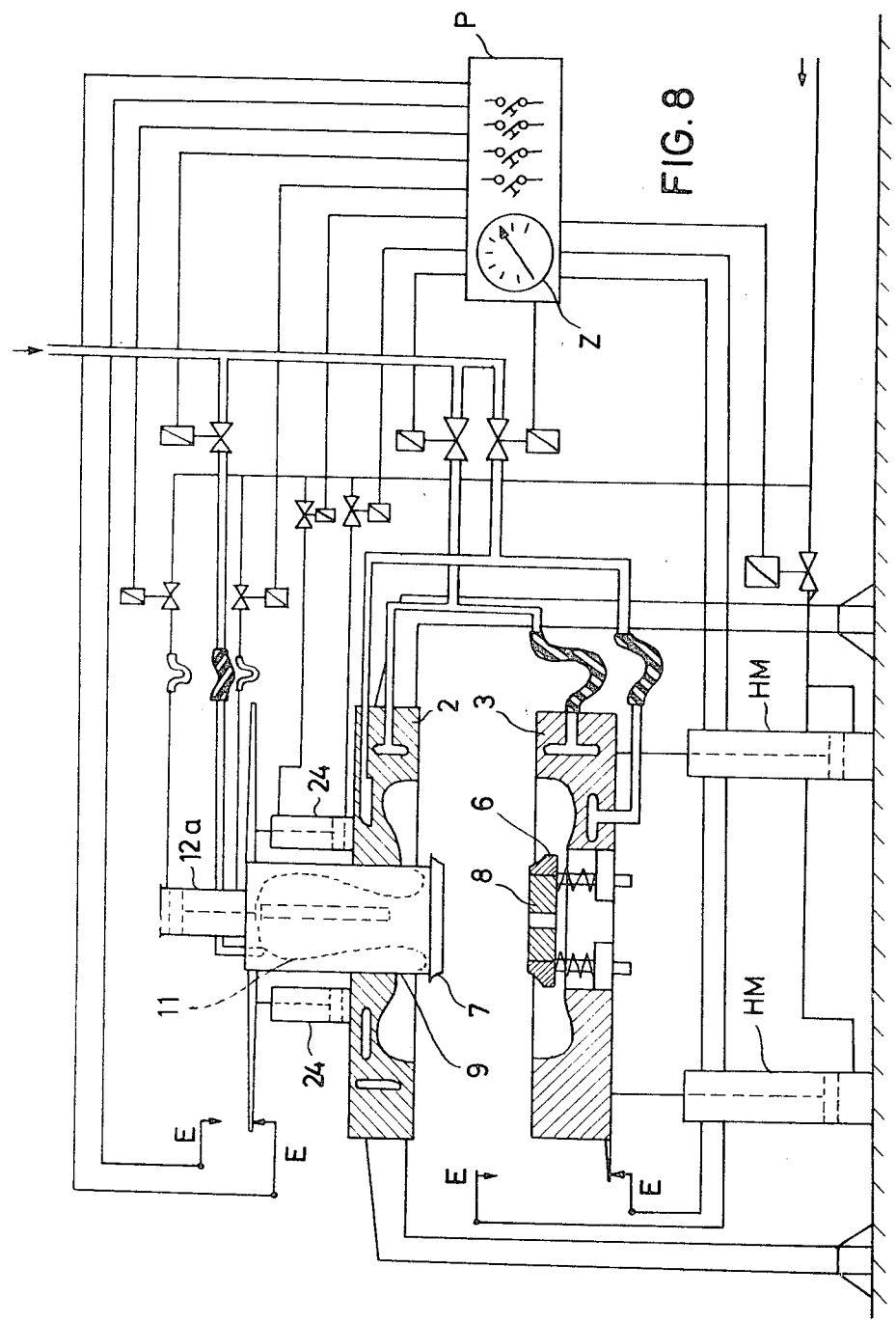

United States Patent Office 3,646,191
Patented Feb. 29, 1972

3,646,191
METHOD FOR INSERTING AN INFLATION BAG INTO A TIRE THAT IS TO BE VULCANIZED
Karl Zängl, 10 Monstrasse, 8000 Munich 13, Germany
Original application July 18, 1966, Ser. No. 565,796, now Patent No. 3,465,385, dated Sept. 9, 1969. Divided and this application Mar. 18, 1969, Ser. No. 833,217
Claims priority, application Germany, Oct. 5, 1965, Z 11,787; Mar. 29, 1966, Z 12,139
Int. Cl. B29h 5/06
U.S. Cl. 264—315    7 Claims

ABSTRACT OF THE DISCLOSURE

Method for vulcanizing a tire in a vulcanization press utilizing an inflatable expander. The tire is positioned in the press with the beads disposed axially between bead-engaging form elements and the form elements are moved toward each other to engage the beads. The elements are then moved further toward each other to a position wherein the beads are positioned close to one another and the elasticity of the beads causes them to be seated in the elements. The expander is then inflated and the elements are moved axially away from each other so that the expander is forced between the beads and into the tire. The elasticity of the beads causes them to remain in place in the elements until the expander is forced therebetween to maintain them in place. The tire is then vulcanized.

---

This application is a division of my copending application Ser. No. 565,796, filed July 18, 1966, now Pat. No. 3,465,385.

The invention relates to a method for inserting an inflatable expander having two edge beads into a tire that is to be vulcanized. Said tire is placed into a vulcanizing press having two form components that are relatively movable toward one another and can be closed so as to form an annulus. Said form components have annular beads at their inner edges, which in operation are at first moved toward one another until they grip the tire beads. The inflatable expander is then inflated and forced between the tire beads into the tire until it fully expands same. The invention further consists in subjecting the bag to pressure of at least one pressure stage after closing of the tire mold until the vulcanizing process is completed.

In one previous method of the above-mentioned type, it is possible to vulcanize new tires having no steel mesh reinforcement, which have an essentially drum-shaped form and are rounded to a circular form upon the enclosing of the heating ring in the interior of same. Thus, the blank is prestressed against the walls of the closed heating ring so that no space remains between the beads of the blank and the annular beads into which the inflatable expander could extend and become damaged. The beads of blanks with steel mesh reinforcements or carcasses to be recapped, however, sometimes leave a space between the annular beads into which the inflatable expander can be forced and ruptured.

There is another known method, however suitable only for recapping of carcasses, according to which method the beads of the carcass are axially pulled apart by a spreading device for reducing the circumference of the carcass when the tire is inserted into the press. In this, the heating ring encloses only the tread of the tire. The vulcanizing press intended for this purpose has a receiving cylinder coaxially displaceable in relation to the heating ring for the inflatable expander which latter is moved into the heating ring opening only after the spreading device has been withdrawn from said opening. In spite of the usual constructional precautions, the tire beads can slide off the bead rings as a result of carelessness of the operators, whereby the inflatable expander may be damaged in the manner as above described.

In this, and all other known presses of a similar type, the reason for the tire beads sliding off the annular beads and the resulting pinching of the inflatable expander lies in the insufficient adherence of the tire beads to the profile of the annular beads. Even when the inflatable expander is forced through between the tire beads into the inside of the tire without being pinched, there still appear difficulties in the known methods if the bead-to-bead measurements of the tire have excessive tolerances. Such excess dimensions cause a gathering of the tire material in the peripheral area when the heating ring is closed. The gathered material of the tire, being pressed against the inner wall of the form and its tread profile by the inflatable expander, can yield only inwardly and forms a ring-shaped bead, so that the tire may no longer be useable. It is therefore very frequently necessary to obtain a second tire form of somewhat larger dimensions for each tire size.

The invention is therefore concerned with the problem of overcoming the above-mentioned difficulties in the insertion of an inflatable expander into a tire to be vulcanized. This is achieved in a process of recapping of tires, or in a process of vulcanizing of tires normally having only a small distance between the tire beads, in that the annular beads are moved closer toward one another before applying pressure to the inflatable expander until they essentially touch one another, and the tire beads are forced into them. The annular beads are then moved apart again to form a circular gap. Simultaneously therewith, pressure is applied to the inflatable expander and forces same between the tire beads and through the circular gap.

In the method according to the invention, the tire beads are, before applying pressure to the inflatable expander, firmly forced into the profiles of the annular beads by direct contact of the latter. As a result of the elasticity of the tire, each of the two tire beads applies an opposing force, even though small, to the annular beads that press them together, and the direction of said opposing force corresponds with the subsequent separating movement of the cooperating annular beads. Because of this, each tire bead automatically follows the separating movement at the beginning of the forming of the circular gap and is immediately secured against sliding off by the entering inflatable expander, by which any danger of damage is prevented.

An advantageous development of the method according to the invention provides that, before closing of the form components while simultaneously applying pressure to the inflatable expander, the annular beads are moved apart again with the tire beads until the latter are positioned a greater than normal distance from one another. Through this step of the process, one can save the otherwise required and expensive spreading device for reducing the circumference of the tire sufficiently that the tire is not pinched between the form components that are approaching one another.

For tires with excessive tolerances of the bead-to-bead measurements, the invention provides additionally that the pressure applied to the inflatable expander is reduced, after closing of the form components but before the start of each vulcanizing process, and the annular beads simultaneously moved toward one another. Subsequently the pressure is increased again and the annular beads are simultaneously moved apart. Thereby, the tire sidewalls are, before the form components are heated, lifted off the mutually facing form surfaces by the reduction of pressure in the inflatable expander and the simultaneous approach of the annular beads, whereby the stressing of the tire material in the peripheral area is relieved. In the subsequent renewed application of pressure to the inflatable expander and moving apart of the annular beads, possible existing excess dimensions are absorbed by the tire sidewalls having in comparison with the material of the tread a substantially greater elasticity, so that the previously mentioned compressing is reliably avoided.

It is especially advantageous, also, if a heated pressure medium, as steam, is used for applying pressure to the inflatable expander. The tire is then heated not only from the outside but additionally from the inside, so that the vulcanizing process can be considerably accelerated.

The vulcanizing presses presently used for carrying out the above defined and known methods have a receiving cylinder for the inflatable expander, which is displaceable coaxially with the tire form and is open at the end facing the second form component, a disc body which is displaceable coaxially with the second form component. Said disc body carries the annular bead which cooperates with the second form component and same can be moved toward the receiving cylinder. In order to modify a known vulcanizing device of such nature in a manner for carrying out the method according to the invention, it is provided that the one beaded edge of the inflatable expander, as well as the annular bead, that is coordinated with the first form component, are disposed at the open end of the receiving cylinder and are together with the same displaceable in the direction toward the opposite annular bead and that the sum of the ranges of displacement of the receiving cylinder and of the disc body is equal to at least the distance of the inner edges of the tire components from one another.

Further advantageous features are that the disc body has a centered opening into which a cylindrical extension of a piston rod of a pressure cylinder can be inserted, said rod being coaxially movable in the receiving cylinder and being connected with the other beaded edge of the inflatable expander, that the cylindrical extension permanently penetrates in a press fit the centered opening of the disc body when the tire form is closed, and that the edge of the disc body that faces the inflatable expander is shaped in the form of a cone with its point facing toward the inflatable expander.

Additional features and advantages of the method according to the invention as well as devices designed according to same can be seen from the subsequent description in connection with the attached diagram. It shows:

FIGS. 4 through 7 each, a bead-to-bead section on an enlarged scale of a tire during the successive steps of the process according to the invention.

Figure 1:
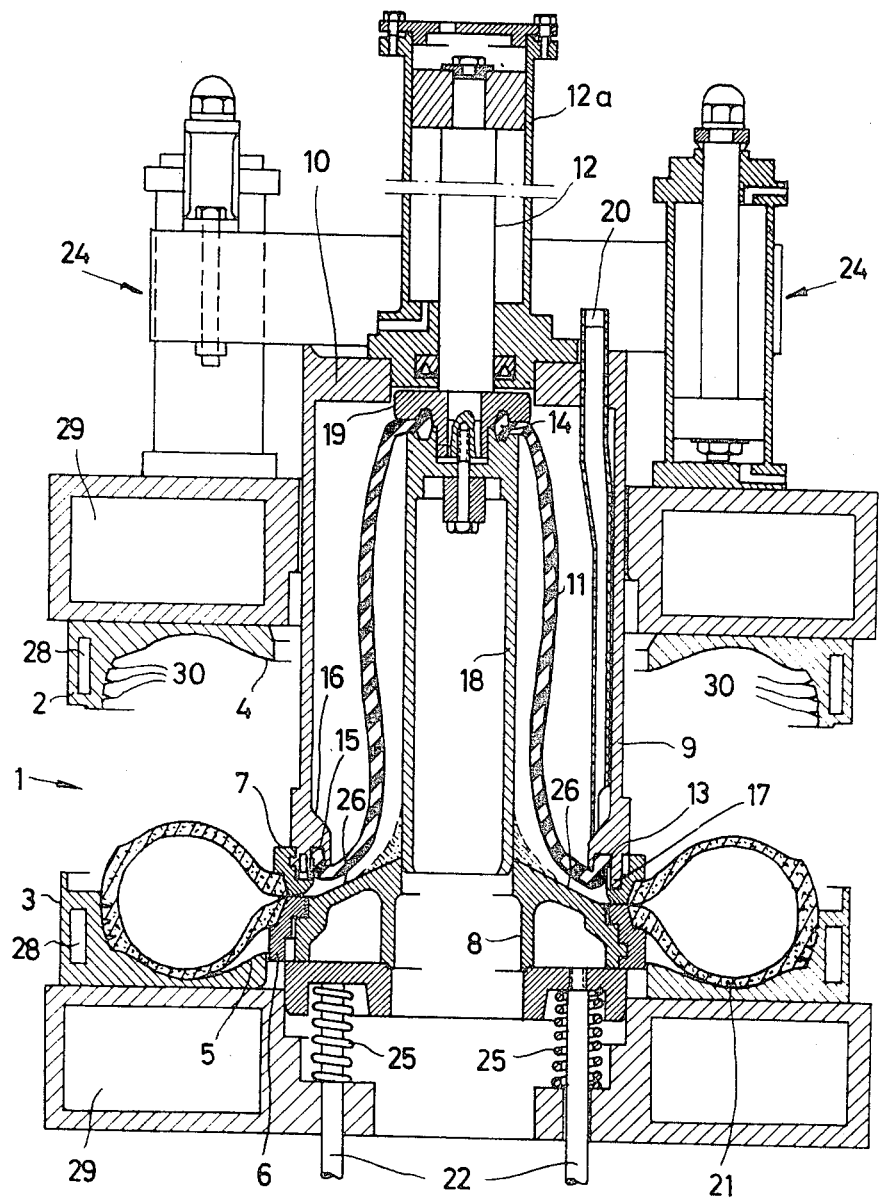
FIG. 1 is a vertical section through a vulcanizing press according to the invention after insertion of a tire.

FIG. 8 is a control system for a vulcanizing press according to FIG. 1.

Figure 2:
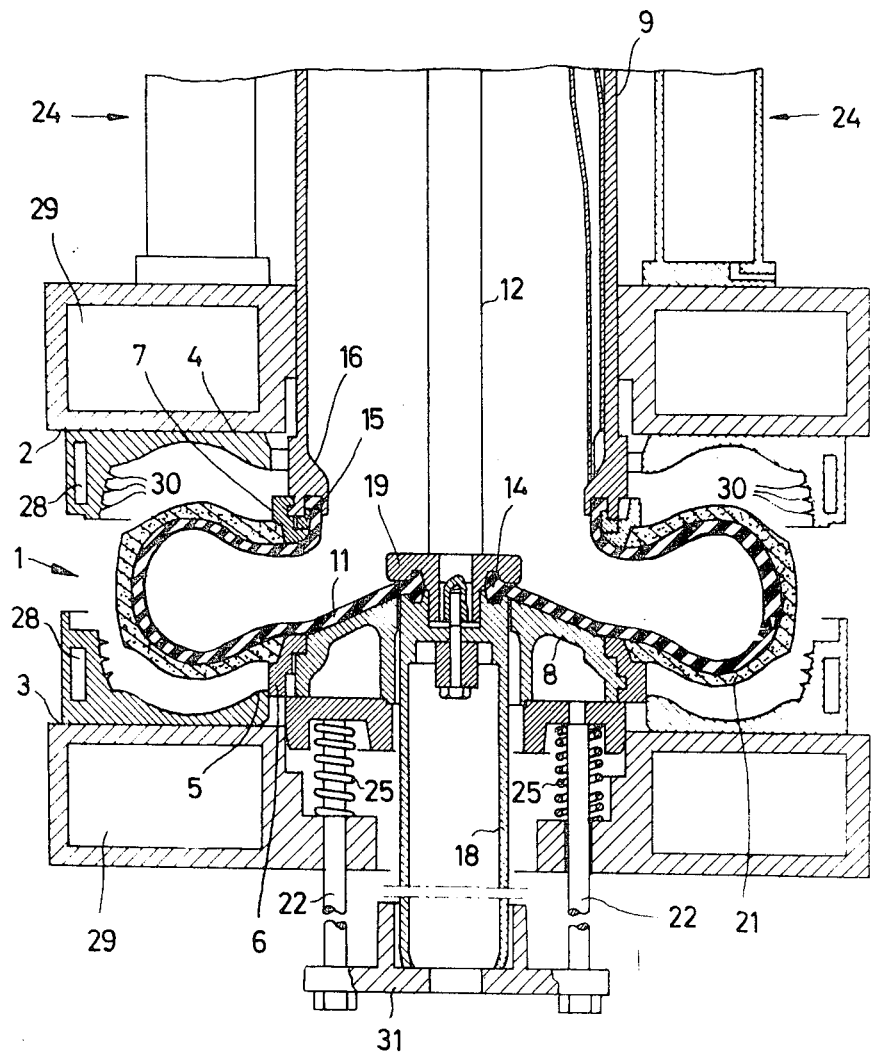
FIG. 2 is a partial view of the vertical section of the vulcanizing press according to FIG. 1 in a position after the beginning of pressure application to the inflatable expander.
Figure 3:
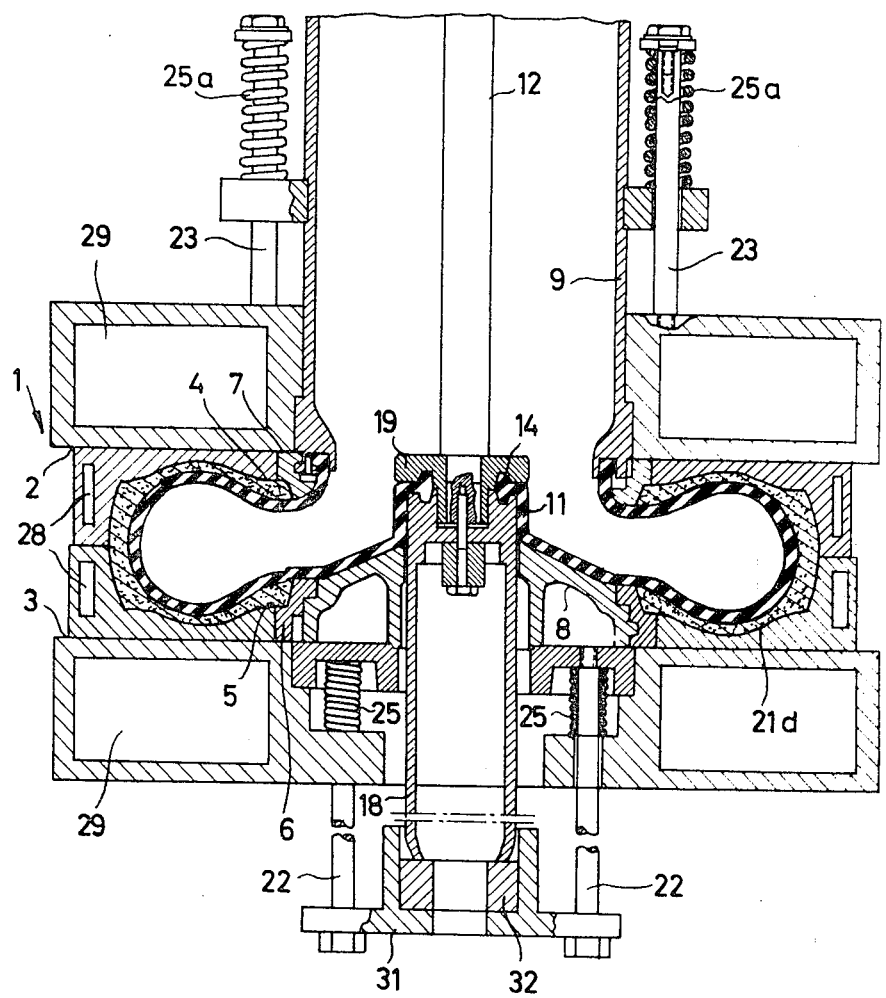
FIG. 3 is a partial view of the vertical section of a vulcanizing press in a modified design in the end position of the forcing process.

A vulcanizing press according to the invention may according to FIGS. 1 through 3 have a tire mold 1, which is comprised of two components 2, 3 disposed symmetrically in relation to their central plane and axially movable toward one another by driving means (not shown).

In the region of the inner edges 4, 5 opposite one another of the tire mold 1, for instance by means of bayonet joints (not shown) bead profiles are arranged in form of a first annular bead 6 and a second annular bead 7, the first of which is disposed at the circumference of a disc body 8 and the second one at the lower open end of a cylinder 9, which is closed at its upper end by a wall 10.

The cylinder 9 serves to receive an elastic inflatable expander 11, which is at one edge attached to the lower open end of the cylinder 9, and at the other edge to a tension element that is axially movable inside the cylinder, as for instance the piston rod 12 of a pressure cylinder 12a.

The inflatable expander 11 is on the edge that is connected with the cylinder 9 designed with a larger diameter than on the other edge, whereby to appear somewhat pear-shaped and both ends are equipped respectively wtih beaded edges 13 and 14. The beaded edge 13 lies in a circular groove 15 of a ring reinforcement 16 and is fixed by a spring ring 17. The other beaded edge 14 is tensioned between an axial cylindrical extension 18 of the piston rod 12 and a bag disc 19, which is braced against a shoulder of the piston rod 12.

The cylinder 9 can be supplied wtih a pressure medium, as for instance through a passageway 20, by which the inflatable expander 11 can be forced into the inside of the tire 21 lying in the tire mold 1 in a manner as is subsequently described in detail. In order to make this possible, the disc body 8 as well as the cylinder 9 are disposed so as to be movable with respect to each of the cooperating form components 3 and 2. For this purpose, the disc body 8 may have guide rods 22, which enter into suitable bores in the form component 3 in press fit relationship. For guiding the cylinder 9, there may according to FIG. 3 likewise be guide rods 23 provided on the form component 2 or, according to FIGS. 1 and 2, cylinder and piston units 24, which latter in addition serve a purpose that is to be described later in detail.

The disc body 8 is within its range of displacement in the direction of cylinder 9 prestressed over a partial range, as for instance by springs 25, which partial range essentially equals the distance from the adjacent inner edge 5 of the tire mold 1 to the central plane.

On the cylinder 9 there act, upon the approach of the annular beads 6, 7 pretensioning forces that are likewise directed toward the disc body 8, which are either also created by springs 25a as shown in FIG. 3 or by the cylinder-piston units 24. These can also be mounted in place of the springs 25 for pretensioning the disc body 8.

The sum of the ranges of displacement which are coordinated respectively with the disc body 8 and the cylinder 9 equals at least the distance between the inner edges 4, 5 opposite one another of the tire mold 1. For reasons which will be explained later in detail, it is expedient, however, if the range of displacement of the cylinder 9 is substantially greater than the distance of the inner edge 4 of the tire mold 1 from the central plane of the neighboring annual bead 7. The cylinder 9 is therefore with respect to the form component 2 sufficiently movable that the lower cylinder end with the annular bead 7 overlaps the lower level of the form component 2.

As one can further see from the figures, the second bead profile 7 is rounded on the end facing the first bead profile 6, while its ends and those of the disc body 8 facing the inflatable expander 11 form a continuous guiding surface 26 for the latter. Said guiding surface 26 defines an obtuse angle, with the wall of the cylindrical extension 18 of the piston rod 12 facing the inflatable expander 11, wherefore the disc body 8 has the form of a cone with its point facing toward the inflatable expander 11. Said cone is designed either with a straight or concave horizontal contour, said latter being indicated diagrammatically with interrupted lines in FIG. 1.

Figure 4:
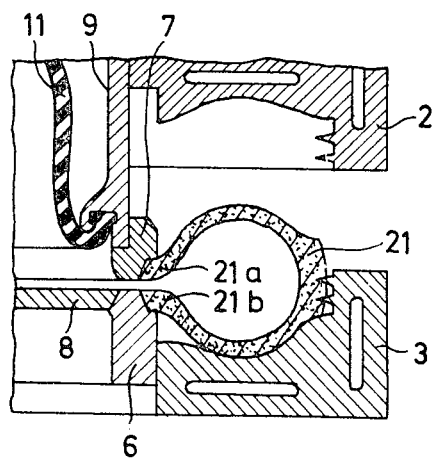
Figure 5:
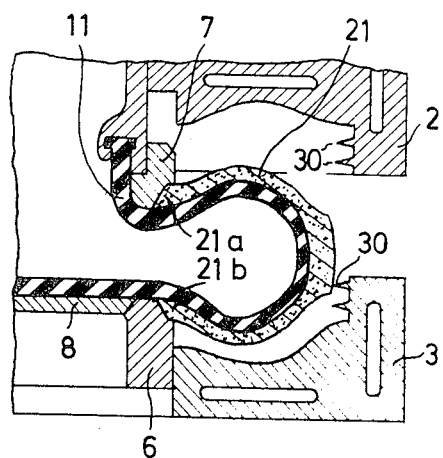

In order to renew a tire tread, such tire 21 is inserted in the lower form component 3 of the opened tire mold, space being provided between the lower band 21b, which is supported by the annular bead 6 as shown in FIGS. 1 and 4, and the neighboring inner edge 5 of the form component 3. Subsequently, the upper form component 2, with the annular bead 7 extending considerably over its lower level on account of the extended range of displacement of the cylinder 9, as was previously mentioned, is coaxially moved close to the lower form component 3, or vice versa. The extending annular bead 7 grips the upper tire bead 21a and presses it toward the lower one until both tire beads touch one another essentially in the area of the central plane of the tire 21.

Subsequently there is formed a narrow circular gap between the bead rings 6, 7 and at the same time, pressure is applied to the inflatable expander 11 by means of a pressure medium. The forming of the circular gap may either be caused (1) solely by the inflatable expander 11, supporting itself under the applied pressure against the disc body 8, or, (2) in a press as shown in FIGS. 1 and 2, the operation of the expander as aforesaid may be supplemented by appropriate application of pressure to the cylinder-piston units 24. The opposing forces of the material of the tire counteracting the pressing together of the tire beads 21a, 21b in the area of the central plane of the tire are for both of its beads substantially equal and cause the same to follow at the beginning of the forming of the circular gap automatically the movement of the cooperating bead rings 6, 7.

As soon as the circular gap attains a width that equals about twice the thickness of the material of the inflatable expander, the latter is forced through between the tire beads and finally fills the inside of the tire 21, in which process the tire beads are steadily pressed farther apart. While the lower tire bead is after a relatively short spreading movement held in the area of the inner edge 5 of the form component 3, the upper tire bead moves together with the cylinder under the pressure of the inflation bag 11 further upward until it reaches the position shown in FIGS. 2 and 5. The tire has in this spread position a smaller outer diameter so that the form components 2, 3 can, in spite of the protruding profiles 3, be moved close to one another without being hindered by the tire, and finally form the closed tire mold 1 as shown in FIGS. 3 and 6.

Figure 6:
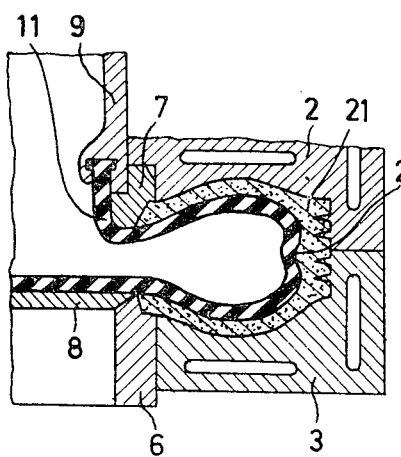
Figure 7:
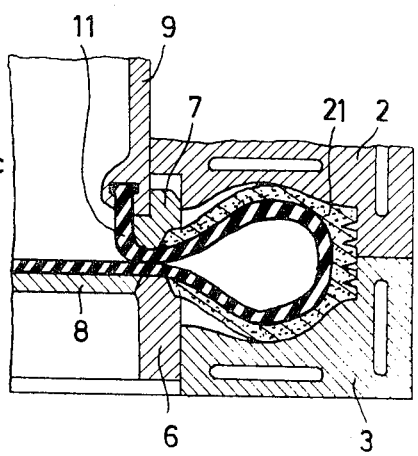

As a result of excessive bead-to-bead measurements there may in the closed form as shown in FIG. 6 appear an upsetting of the tire material in the peripheral area so that it, held at the outside against the closed tire mold 1, yields toward the inside and forms an annular bead 21c. In order to prevent forming of this bead 21c, the pressure applied to the inflatable expander 11 is according to the invention reduced after closing of the mold 1 but before the start of each vulcanizing process, the bead rings 6, 7 simultaneously again being moved toward one another so that the tire sidewalls are lifted off the surface of the form components 2, 3 facing one another. The tension of the tire material is thereby relieved in the area of the tread, as shown in FIG. 7 and the bead 21c is eliminated.

Subsequently, the pressure in the inflatable expander 11 is again increased while at the same time the bead rings 6, 7 are moved apart into the position shown in FIGS. 3 and 6, the inflatable expander 11 remaining under at least one pressure stage until completion of each vulcanizing operation. For applying pressure to the inflatable expander 6, one may also use a heated pressure medium, as for instance hot water or steam, by means of which the inflatable expander is advantageously preheated with a low pressure stage until the required elasticity is attained and before being forced into the first tire to be vulcanized of a daily output.

Also the tire mold 1 is heated with at least one pressure stage. For this purpose said mold is provided with separate heating channels 28, 29 in the area of the treads of the tires and their sidewalls, which can be used as desired either for vulcanizing of new tires and for recapping of old tires.

After heating is completed, the pressure within the inflatable expander 11 is relieved and the piston of the pressure cylinder 12a is subjected to pressure from below so that the inflatable expander 11 is pulled out of the tire 21 with the stroke of the piston rod 12. The decrease of the pressure in the cylinder 9 causes the latter and the disc body 8 with the bead rings 6, 7 disposed thereon to move toward one another and finally reach the position shown in FIG. 7.

Upon subsequent opening of the tire mold 1, the extended movement of the cylinder 9 again makes the withdrawal of the bead ring from the lower part of the form component 2 possible so that the tire 21 is released from its grip and remains in the lower form component 3. By an additional lifting of the disc body 8 or by lowering the same with the lower form component 3 against a guide piece (not shown), the tire 21 is released from the lower form component 3 and ejected.

It is evident from the above description of the operating method of the vulcanizing press that the pressure cylinder 12a needs to be designed merely for single action since the downward stroke of the piston rod 12 is created by the pull both of the pressurized inflatable expander 11 and by the resulting downwardly directed force with which the pressure acts on the differential surface between the cross sections of the piston rod 12 and its axial extension 18.

According to the size of the tire 21, there is in each operation a specific longitudinal section of the inflatable expander 11 forced into the tire 21. In the largest dimension of the tire corresponding to a given design, the upper end of the inflation bag 11 in the area of the beaded edge 14 touches the sharp upper ring edge of the disc body 8 and could be damaged by the same. It is therefore desirable to arrange on the guide rods 22 of the disc body 8 a guide piece 31 with upwardly pointing ring flange for limiting the downward stroke of the tubular extension 18. According to FIG. 3, however, the inflatable expander 11 fills a tire 21d of smaller dimensions before the tubular extension 18 of the piston rod 12 has reached the lowest end position. The excess length of the inflatable expander 11 lies here like a cylinder jacket on the upper end of the tubular extension 18. In order to preclude this extension deforming like the bellows of an accordion by the extension 18 being pressed downward by the applied pressure, it is desirable to mount spacers 32 on the guide piece 31 that are properly dimensioned according to the dimensions of the tires being processed. Even though the construction of the pressure cylinder 12a as a double-acting unit is not required for the reasons previously explained, this might still be advantageous in some instances in order to facilitate exchanging of the inflatable expander 11.

If the press is to be used for vulcanizing new tires, then the cylinder 9 and the disc body 8 are moved against the action of the springs 24, 25 into the end positions in which the bead rings 6, 7 lie in the immediate region of the neighboring inner edges 4, 5 of the tire mold 1 and are locked in these positions.

Further there may be provided a control system according to FIG. 8 for the automatic control of the applied pressure and/or of the mechanical or hydraulic means HM for moving the form components 2, 3. Such control system may also control the movement of the cylinder-piston units 24 as well as the heating of the tire mold 1. This may have a program switch P operating together with end position switches E and/or a time switch Z for setting the vulcanizing periods.

Even though the illustration presents a preferred embodiment of the invention, the same can be provided within the scope of the subsequent claims by various modifications and all of the features and construction details appearing in the illustration and the respective modifications can individually and in any combination be an integral part of the invention.

The embodiments of the invention in which an exclusive property or privilege is claimed are defined as follows:

1. In a method of vulcanizing a tire within a vulcanization press having an inflatable expander and a pair of axially opposed bead-engaging form elements, said form elements being relatively axially urged toward one another, the improvement comprising the steps of:

positioning a tire in said press so that the beads on the tire are disposed axially between the form elements, the beads of the tire being normally axially spaced a determined distance apart;

moving the bead-engaging form elements relatively toward one another into engagement with the axially spaced beads on the tire; then moving the bead-engaging form elements relatively axially toward one another to a position wherein the tire beads are positioned closely adjacent one-another and are substantially less than said determined distance apart, whereby the beads of the tire are elastically deformed to insure a proper engagement thereof with the bead-engaging form elements; then inflating the inflatable expander with pressure fluid to substantially simultaneously effect (1) an inflation of the inflatable expander between said tire beads into the tire whereby the inflated expander securely maintains the beads of the tire in engagement with the bead-engaging form elements independent of the original axial spacing therebetween and (2) a separation of the beads of the tire axially away from one another while maintaining said beads in engagement with said bead-engaging form elements, the elastic deformation of the beads of the tire causing the beads of the tire to remain in secure engagement with the bead-engaging form elements during the initial axial separation thereof until the beads of the tire are spaced apart by a sufficient distance to permit the inflatable expander to squeeze therebetween.

2. A method according to claim 1, wherein the tire beads are initially axially moved toward one another by said bead-engaging form elements until the tire beads substantially touch one another adjacent the central plane of the tire.

3. The method according to claim 1, wherein the inflatable expander is inserted between the tire beads over a guide surface.

4. The method according to claim 1, wherein the fluid used for applying pressure to the inflatable expander is a heated pressure medium.

5. The method according to claim 4, wherein the heated pressure medium is steam.

6. A process according to claim 1, wherein the step of inflating the inflatable expander with pressurized fluid is continued until the inflatable expander causes the beads of the tire to be axially moved away from one another until the beads have a spacing therebetween greater than said determined distance to thereby reduce the outer diameter of the tire.

7. The method according to claim 6, wherein the vulcanization press has a pair of relatively movable molds and includes the further steps of:

moving the relatively movable molds toward one another to a closed position after the outer diameter of the tire has been reduced;

reducing the fluid pressure applied to the inflatable expander, which is now inside the tire, to effect a movement of the tire beads toward one another to relieve the stresses on the tire; and thereafter again increasing the fluid pressure applied to the inflatable expander to again move the tire beads axially away from one another whereby the tire is relieved to thereby prevent the formation of undesirable contours in the tire.

References Cited

UNITED STATES PATENTS

| | | | |
|---|---|---|---|
| 2,874,405 | 2/1959 | Stanford | 264—315 |
| 2,997,738 | 8/1961 | Soderquist | 264—315 |
| 3,195,179 | 7/1965 | Laube | 18—17 WX |
| 3,298,066 | 1/1967 | Soderquist | 264—326 X |
| 3,396,221 | 8/1968 | Balle et al. | 264—315 |

ROBERT F. WHITE, Primary Examiner

J. H. SILBAUGH, Assistant Examiner